(12) United States Patent  
Vioni et al.

(10) Patent No.: US 9,070,165 B2  
(45) Date of Patent: Jun. 30, 2015

(54) METHOD OF MATCHING HEDGE FUNDS AND INVESTORS AND APPARATUS THEREFOR

(71) Applicants: Lisa Vioni, Bronxville, NY (US); Robert Gordon Stuart Arthurs, Bronxville, NY (US)

(72) Inventors: Lisa Vioni, Bronxville, NY (US); Robert Gordon Stuart Arthurs, Bronxville, NY (US)

( * ) Notice: Subject to any disclaimer, the term of this patent is extended or adjusted under 35 U.S.C. 154(b) by 0 days.

(21) Appl. No.: 13/920,883

(22) Filed: Jun. 18, 2013

(65) Prior Publication Data

US 2013/0282620 A1    Oct. 24, 2013

Related U.S. Application Data

(63) Continuation of application No. 11/915,253, filed as application No. PCT/US2006/019910 on May 23, 2006, now Pat. No. 8,468,078.

(60) Provisional application No. 60/683,586, filed on May 23, 2005.

(51) Int. Cl.  
*G06Q 40/06* (2012.01)  
*G06Q 40/02* (2012.01)

(52) U.S. Cl.  
CPC ............... *G06Q 40/06* (2013.01); *G06Q 40/02* (2013.01)

(58) Field of Classification Search  
CPC ............................... G06Q 40/02; G06Q 40/06  
See application file for complete search history.

(56) References Cited

U.S. PATENT DOCUMENTS

| | | |
|---|---|---|
| 5,864,827 A | 1/1999 | Wilson |
| 5,978,778 A | 11/1999 | O'Shaughnessy |
| 6,026,381 A | 2/2000 | Barton, III et al. |
| 6,041,326 A | 3/2000 | Amro et al. |
| 7,013,291 B1 | 3/2006 | Green |
| 2002/0073006 A1 | 6/2002 | Goldman |
| 2002/0087446 A1 | 7/2002 | Reddy |
| 2002/0087450 A1 | 7/2002 | Reddy |
| 2002/0087506 A1 | 7/2002 | Reddy |
| 2003/0069821 A1 | 4/2003 | Williams |
| 2003/0101115 A1 | 5/2003 | Reddy |
| 2003/0172026 A1 | 9/2003 | Tarrant |
| 2003/0220865 A1 | 11/2003 | Lutnick |
| 2003/0236742 A1 | 12/2003 | Lawrence |

FOREIGN PATENT DOCUMENTS

| | | |
|---|---|---|
| WO | 96/18963 | 6/1996 |
| WO | 01/84431 | 11/2001 |

*Primary Examiner* — Daniel Felten  
(74) *Attorney, Agent, or Firm* — Gifford, Krass, Sprinkle, Anderson & Citkowski, P.C.; Mark D. Schneider

(57) ABSTRACT

A method for matching a hedge fund and a hedge fund investor, and apparatus therefore, may utilize databases that may be searched by search engines. The databases and the search engines may be accessed using a website. Information regarding the investor may be stored in one database and information relating to the hedge fund may be separately stored in the other database. An investor may access the search engine associated with the database containing hedge fund information to identify hedge funds that may be relevant to that investor. Likewise, a hedge fund may access the search engine associated with the database containing investor information to identify qualified investors that may be interested in the hedge fund.

20 Claims, 2 Drawing Sheets

METHOD OF MATCHING HEDGE FUNDS AND INVESTORS AND APPARATUS THEREFOR

CROSS-REFERENCE TO RELATED APPLICATIONS

This Application is a Continuation of application Ser. No. 11/915,253 filed on Dec. 12, 2007, now U.S. Pat. No. 8,468,078, which is a National Stage of Application PCT/US2006/019910, which in turn claims the benefit of U.S. Provisional Application 60/683,586 filed on May 23, 2005, the contents of which are incorporated herein in their entirety.

BACKGROUND OF THE INVENTION

1. Field of the Invention

The present invention is directed to the hedge fund industry. More particularly, the invention is directed to a method and associated apparatus that may allow direct interaction and information flow between hedge funds (or types of investment vehicles or entities) and investors in those funds (or types of investment vehicles or entities). The method may use dual search engines, one of which may permit a hedge fund to review a database of qualified investors and identify investors that match certain criteria. The other search engine may enable a qualified investor to review a database of hedge funds and identify a hedge fund that matches the investor's criteria. Therefore, the method may permit hedge fund agents direct access to investors and may also permit qualified investors to gain access to detailed hedge fund information and agents.

2. Reference to Related Art

A hedge fund is a form of investment vehicle that may be used by certain individuals and institutions to engage in aggressive and/or speculative investment activity not open to ordinary mutual funds. Indeed, the offering memorandum of many hedge funds allows those funds to use a combination of sophisticated investment strategies, such as taking both long and short positions, using leverage and derivatives, and investing in many markets, in an effort to secure a higher return on investment. However, in return for the ability to adopt these aggressive investment positions, hedge funds are made subject to significant oversight and regulation. For example, hedge funds are not permitted to advertise and hedge fund investors must meet certain legal requirements. These investors must also be able to establish certain financial criteria and are presumed to be sufficiently knowledgeable to understand the risks related to hedge fund investing. Many hedge funds also have extremely high minimum investment amounts ranging from $250,000 to well over $1 million and the managers of hedge funds may charge significant fees and commissions for their services.

Investor participation in hedge funds appears to be growing, however, the rate of such growth could be increased. One factor that may be holding back growth in the hedge fund market may be current market conditions, wherein there exists a wide variety of available funds, but a relatively small group of available qualified investors. Stated differently, the market presently features an array of different hedge funds from which an investor may choose. However, the high minimum dollar amounts required to invest in hedge funds will generally mean that the pool of qualified investors available to participate in any given hedge fund is relatively small. Accordingly, to simulate growth in hedge fund investing, means need to be developed whereby this finite group of investors can be matched with appropriate hedge fund opportunities.

Past methods of connecting eligible investors with funds of interest to those investors may be unfruitful and are typically very expensive. These prior methods included the hedge funds retaining third-party marketing firms to find qualified investors. Indeed, hiring such a firm may be critical to a funds' success since, as mentioned above, hedge funds are not permitted to advertise. However, these third-party firms are extremely expensive, with some charging up to 20% in perpetuity of all fee on money raised by the firm. Therefore, it would be desirable to provide a method to match hedge funds and hedge fund investors that is controlled, discrete and allows for an easy exchange of ideas and information in a confidential and secure environment at a low cost.

Concerning potentially related art, Published U.S. Patent Application Nos. 2002/0087506, 2002/0087446, 2002/0087450 and 2003/0101115 are directed to methods for matching inventors with entrepreneurs. Further, U.S. Pat. No. 7,013,291 is directed to a "Financial Instrument Filtering System and Method Therefor" and describes a method wherein a user first selects certain filter criteria including an "investment parameter". This filter criterion is then matched against a database of financial instruments. Once matched, the user receives a "histogram" based on the output data.

SUMMARY OF THE INVENTION

The method concerns the hedge fund industry, where investors may desire access to a broad range of investment opportunities and hedge funds may desire more efficient and effective access to investors and investor capital without the help of expensive intermediaries. Specifically, the method may allow direct interaction and may provide, subject to certain safeguards, unobstructed flow of information between a hedge fund(s) and an investor(s). In the method, a hedge fund may be charged a fee to gain access to an investor(s) in a manner that may also result in no commission on the backend. The method may also permit investors to gain access to detailed information on hedge funds. The method may be implemented using dual search engines, or the like that may allow hedge funds to contact a database of qualified investors that match the fund search criteria. The method may also use the search engines to enable investors to search for hedge funds that match the investor's specific parameters. The search engines, databases and related information may be stored on one or more computer servers. Access to the search engines and databases may be provided though a single website or other form of communication portal that may itself be accessed globally via the Internet or like global computer network

BRIEF DESCRIPTION OF THE DRAWINGS

In the following description, reference will be made to the associated drawings, wherein like reference numbers refer to like parts throughout, and wherein.

DETAILED DESCRIPTION OF THE PREFERRED EMBODIMENTS

A method for matching or otherwise connecting hedge fund(s) and hedge fund investor(s) may utilize two databases that may be searched by two separate search engines, each search engine being associated with one of the databases.

Further, the databases and the search engines may be accessed using a single website or other communication portal. The search engines, databases and website may reside on one or more computer servers. Information concerning the investor(s) may be stored in one database and information relating to the hedge fund(s) may be stored in the other database. An investor or agent thereof may access the search engine associated with the database containing hedge fund information to identify a hedge fund(s) that may be of interest to the investor. Likewise, a hedge fund or agent thereof may access the search engine associated with the database containing investor information to identify a qualified investor(s) that may be interested in the hedge fund. An investor(s) may be permitted access to the hedge fund information database for a fee or at no cost. Hedge funds may also be permitted to access to the investor information database for a fee or at no cost.

Figure 1:
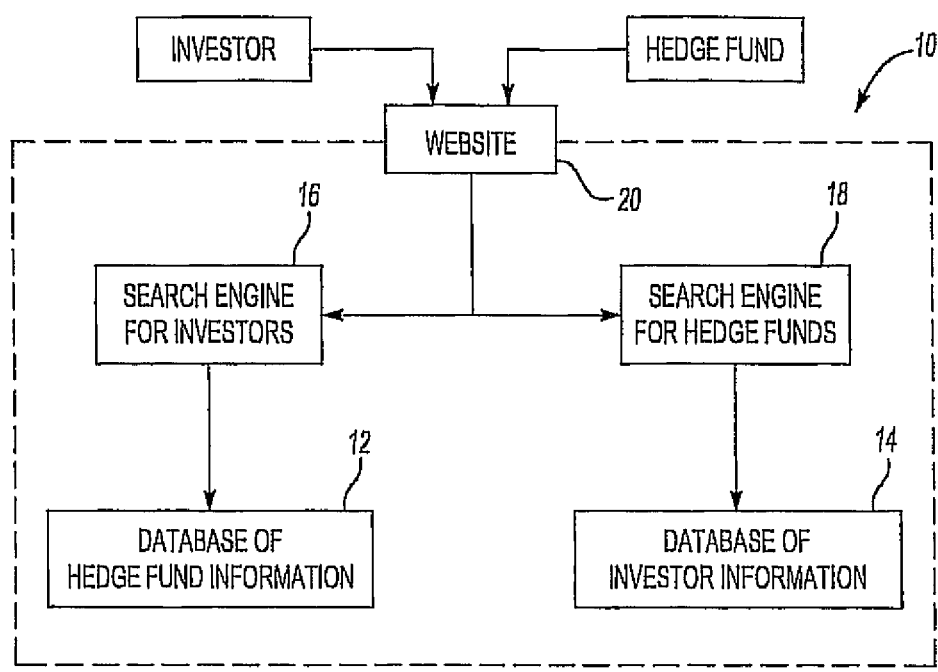
FIG. 1 is a diagrammatic view of apparatus associated with an embodiment of the method of the present invention.

Referring now to FIG. 1, a method 10 for matching or otherwise connecting a hedge fund(s) (and agents thereof) with a hedge fund investor(s) (or agents thereof) may include two databases 12, 14 that may be searched by two search engines 16, 18, each search engine 16, 18 being associated with one of the databases 12, 14. The databases 12, 14 and the search engines 16, 18 may be accessed though a single website 20 or communication portal. However, it will be appreciated that two separate websites or portals may be used with each website being associated with one of the search engines 16, 18. Information concerning an investor may be stored in one database 14 and information relating to the hedge fund may be separately stored in the other database 12. Notably, while the information in the other database 12 will be generally described herein a specifically directed to hedge funds and hedge fund entities, it will also be appreciated that information on other, alternative or additional, investment vehicles and entities may also be stored in the other database 12. For example the other database 12 may include information on hedge funds, Fund of Funds, Commodity Trading Advisor (CTA) and other types of financial entities. An investor, or agent thereof, may use the search engine 16 associated with the database 12 containing hedge fund information to identify a hedge fund that may be of interest to the investor. Likewise, a hedge fund, or agent thereof, may access the search engine 18 associated with the database 14 containing investor information to identify a qualified investor that may be interested in the hedge fund.

The search engines 16, 18, the databases 12, 14 and the website 20 or communication portal may be resident on a computer server (not shown) that may be accessed remotely via an intranet, Internet or a global computer network. These elements may also be resident on a handheld electronic device (e.g., a PDA or handheld computing device), a laptop computer or other manner of portable electronic device such that they may be directly accessed by a user on an as-needed basis. Further, the website 20, search engines 16, 18, the databases 12, 14 may be accessed by investors, investor agents and hedge fund agents using PCs, computer servers, handheld devices and the like via an intranet or a global computer network.

Figure 2:
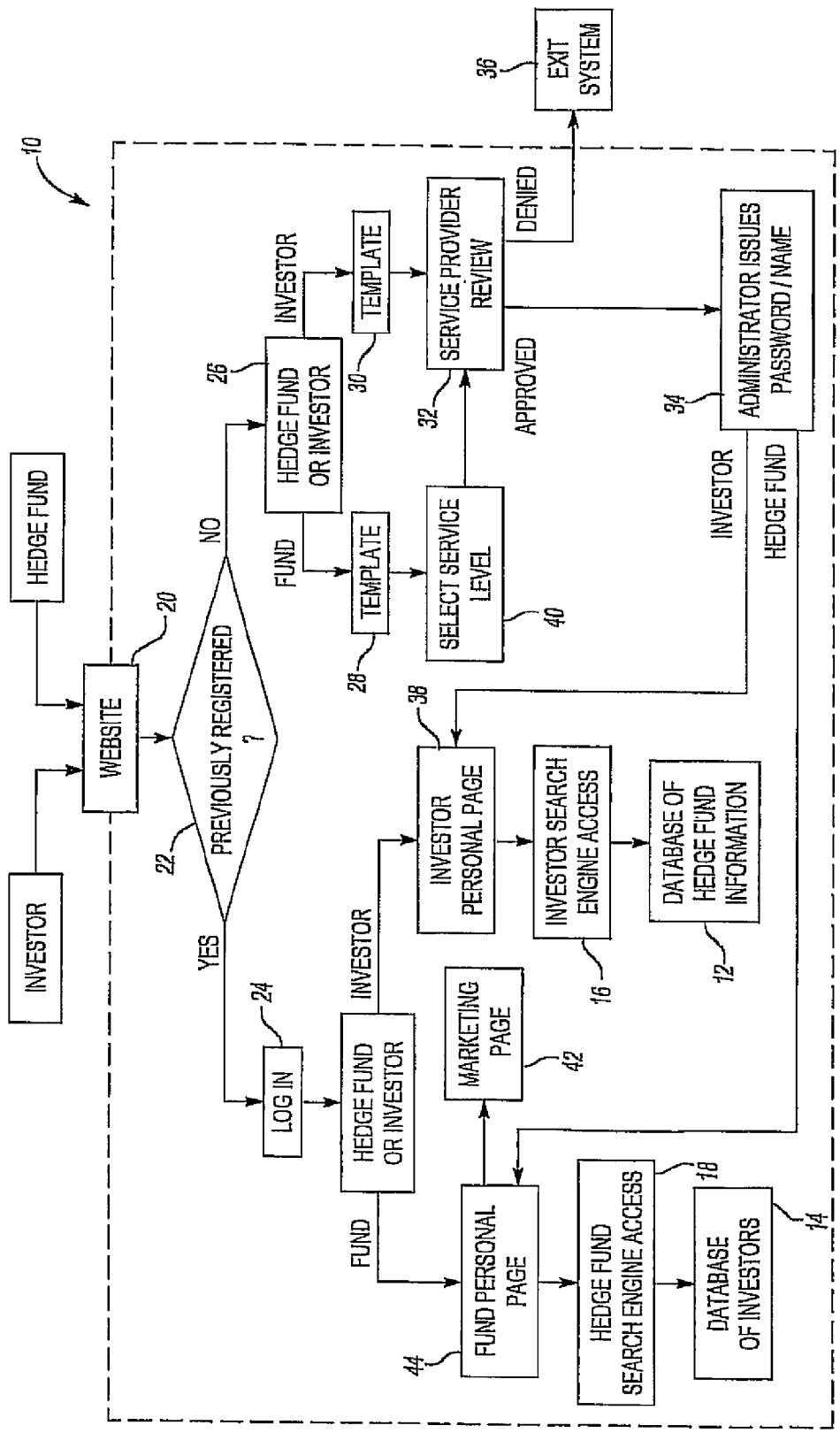
FIG. 2 is a flowchart highlighting certain steps in an embodiment of the method of the present invention.

Referring now to FIGS. 1 and 2, the method 10 may included a step whereby upon visiting the website 20 or other manner of communication portal participating investors and hedge funds are first prompted to:

1) enter specified separate sections of the website;
2) enter hedge fund or investor information into the appropriate database 12, 14.

Further, if the investor or hedge fund has already entered hedge fund or investor information into the appropriate database 12 or 14, the hedge fund or investor may be permitted use of an appropriate search engine 16, 18 to perform a search of the hedge fund or investor information on the database 12, 14 according to pre-selected parameters.

More specifically, and still referring now to FIGS. 1 and 2, investors and hedge funds may each access the website 20 or portal wherein, if the participant is previously registered 22, participant is prompted to log in 24 using a username and password. All registered participants may also be required to agree to a user or service agreement each time they access the website 20 or portal. If the participant has not previously registered 22 with the website 20, the participant may be required to register 26 or otherwise indicate if they are an "investor" or a "hedge fund." For example, separate pull down menus (not shown) may be provided for investor participants and hedge fund participants. Next, for first time participants, a questionnaire or template 28, 30 for the entry of data screens may be provided, again through the use of dropdown menus. Upon being presented with a template 28, 30, the investor or hedge fund may be prompted to enter the information required for registration.

For example, in the case of an unregistered investor, the investor may be prompted to enter the following information (categories are shown in capital letters and potential selections for each category are provided under each category):

Investor Data Entry Information (i.e., Hedge Fund Searched Information)

1. TYPE OF INVENTOR

Advisor, Bank, Endowment, Family Office, Family Office/Fund of funds, Foundation, Fund of funds, High Net Worth Individual, Incubator, Pension Fund, Structured Products, Other.

2. INVESTOR STRATEGY OF INTEREST

Capital Structure Arbitrage, Convertible Arbitrage, Country Specific, CTA/Managed Futures, Currency, Distressed, Emerging Markets, Energy Sector, Event Driven, Finance Sector, Fixed Income (non-Arbitrage), Fix Income Arbitrage, Fund of Funds ("FOF")(Market Neutral), FOF (Multi-Strategy), FOF (Single Strategy), Healthcare Sector, Long Only, Long/Short Equity, Macro, Market Neutral Equity, Market Neutral Quantitative, Market Timer, Merger/Risk Arbitrage, Mortgages, Multi-Strategy, Option Strategies, Other, Other Arbitrage, Regulation D, Short Bias, Short-term Trading, Small/Micro Cap, Special Situations, Statistical Arbitrage, Technology Sector, Value, VC/Private Equity.

3. AMOUNT INVESTOR HAS TO INVEST IN HEDGE FUNDS

Less then 5 Million, 5-20 Million, 20-50 Million, 50-100 Million, 100-200 Million, over 200 Million.

4. TRACK RECORD REQUIRED BY INVESTOR

Does not Matter, 1 year or more, 2 years or more, 3 years or more.

5. INVESTOR INVESTS IN

Both, Onshore Funds, Offshore Funds.

6. SHARPE RATIO REQUIRED BY INVESTOR

Does not Matter, 1 or greater, 2 or greater, 3 or greater, 4 or greater, 5 or greater, 6 or greater, 7 or greater, 8 or greater, 9 or greater, 10 or greater.

7. PERCENTAGE INVESTOR CAN INVEST IN HEDGE FUNDS

Does not Matter, Up to 3%, Up to 5%, Up to 10%, Up to 15%, Up to 20%, Up to 30%, 30% or more.

8. INVESTOR REQUIRING AUDITED FINANCIALS

Does not Matter, Yes, No.

9. INVESTOR WILL LOOK AT FUNDS THAT USE LEVERAGE

Does not Matter, Yes, No.
  10. INVESTOR THAT SEEDS HEDGE FUNDS
  Does not Matter, Yes, No.
  11. INVESTOR REQUIRES ACCESS TO A RISK REPORT
  Does not Matter, Yes, No.
12. INVESTOR REQUIRES HEDGE FUND TO BE A REGISTERED INVESTMENT ADVISOR
  Does not Matter, Yes, No.
  13. LOCATION OF INVESTOR
  Any, List of Countries.

Alternatively, in the case of a new hedge fund participant, the agents thereof may be prompted to enter the following information (categories are shown in capital letters and possible selections for each category are provided under each category):

Hedge Fund Data Entry Information (i.e., Investor Searched Information)

1. PERFORMANCE
  YTD, Last Month, Since Inception, Best Performing, Maximum Drawdown, Positive Months, Negative Months, NAV, Alpha, Beta, Sharpe Ratio, Standard Deviation;
2. NAME OF HEDGE FUND
3. STRATEGY
  Capital Structure Arbitrage, Convertible Arbitrage, Country Specific, CTA/Managed Futures, Currency, Distressed, Emerging Markets, Energy Sector, Event Driven, Finance Sector, Fixed Income (non-Arbitrage), Fix Income Arbitrage, Fund of Funds ("FOF")(Market Neutral), FOF (Multi-Strategy), FOF (Single Strategy), Healthcare Sector, Long Only, Long/Short Equity, Macro, Market Neutral Equity, Market Neutral Quantitative, Market Timer, Merger/Risk Arbitrage, Mortgages, Multi-Strategy, Option Strategies, Other, Other Arbitrage, Regulation D, Short Bias, Short-term Trading, Small/Micro Cap, Special Situations, Statistical Arbitrage, Technology Sector, Value, VC/Private Equity.
4. ASSETS UNDER MANAGEMENT (AUM)
  Less than 1 Million, 1-5 Million, 5-10 Million, 10-50 Million, 50-100 Million, 100-250 Million, 250-500 Million, over 500 Million.
5. LOCATION OF FUND
  Does not Matter, Onshore, Offshore.
6. TRACK RECORD
  Does not Matter, 1 year or more, 2 years or more, 3 years or more.
7. CAPACITY
  Less then 1 Million, 1-5 Million, 5-10 Million, 10-50 Million, 50-100 Million, 100-250 Million, 250-500 Million, over 500 Million.
8. INFRASTRUCTURE
  1-5, 5-10, 10-25, 25-50, 50+.
9. MARKETER'S NAME
10. PORTFOLIO MANAGER'S NAME
11. AUDITED FINANCIALS
  Yes, No, Does not Matter.
12. DOES FUND TAKE SEED CAPITAL
  Yes, No, Does not Matter.
13. OPEN TO NEW INVESTORS
  Yes, No, Does not Matter.
14. LOCATION OF FUND
  Any location, List of Countries.

Still referring now to FIGS. 1 and 2, a third party service provider 32 may be provided to establish the authenticity, reliability or trustworthiness of the information entered into either the hedge fund template 28 or the investor template 30. Examples of service providers 32 include in-house review personnel and outside agencies such as law firms, financial investment firms and credit agencies. A system administrator 34 may also be provided to monitor use of the website 22, search engines 16, 18 and databases 12, 14 and control access thereto. Alternatively, the service provider 32 and the system administrator 34 may combined into a single entity. The Administrator 34 may hide (i.e., render unsearchable) or remove hedge fund and/or investor profiles from a database 12, 14 on an as needed basis.

Still referring now to FIGS. 1 and 2, following an investor's entry of information into a questionnaire or template 30, the investor may be required to consent to the terms of service provider agreement. Then, the template information may be forwarded to a service provider 32 who may then determine whether the investor is legally or otherwise qualified to invest in a high-risk investment such as a hedge fund. If the service provider determines that an investor is not a qualified investor, the investor is not permitted access hedge fund database and may be exited 36, denied entry or otherwise removed from the system. The investor may also be notified why they were rejected. If the investor is a qualified investor, the investor may be prompted to enter investor contact information and investor profile information. The investor profile information may include the information previously provided by the investor in the questionnaire or template 30. Alternatively, the investor profile may include a combination of questionnaire or template 30 information and additional information requested by the administrator 34. Once the investor contact information is entered, the administrator 34 may receive notice that there is a pending investor. The administrator 34 may then contact the investor and review the investor's profile information to discern whether the investor will be granted access to the system (i.e., further access website 22, or to the hedge fund search engine 16). For security, the administrator 34 may issue an approved investor a temporary user name and password for entrance to the website 22 or search engine 16. The investor may then use the temporary user name and password to gain access to a personal page 38 for the investor that contains all the information that the investor has entered and allows access to the hedge fund information database. All contact and template information entered by the investor may also be transferred into the database 14 of investor information to function as the profile for that investor.

Still referring now to FIGS. 1 and 2, regarding the hedge fund, following entry of information into the questionnaire or template 28, the hedge fund may select a level of service 40. These levels of service may include limitations on the number of investor profiles a hedge fund may access over a given period of time. For example, depending on the level of service a hedge fund may be granted the ability to review a total of 180 investor profiles or more depending (for example) on the number of investor profiles in the database 14. However, the hedge fund may also be restricted or otherwise capped to between 10-20 investor reviews per month. Further examples of hedge fund service levels are set forth below:

1. Executive Membership—permits 180 investor profile views—limited to 20 per month.
2. Senior Membership—permits 96 investor profile views—limited to 15 per month
3. Junior Membership—permits 36 investor profile views—limited to 10 per month
4. A La Carte Membership—permits participating fund to purchase bundles of 3 investor profiles
5. Trial—permits participating fund to view a total of 3 investor profiles The number of available investor profile views may be rolled over each month or may be non-cumulative. Investor profile views may also be time sensitive, such that any the views are cancelled after a period of time if not used (e.g., annually).

Further, the hedge funds may also be provided with additional services depending on the level of service 40. For example, the hedge funds may be provided with the ability to contact one or more investors quickly using a virtual business card ("VBC"). A VBC is an e-mail message containing the hedge fund contact information, the fund logo, and a short personal note prepared by the hedge fund. The VBC may be sent directly to an inbox provided for the investor as part of the investor's personal page 38. Additional features may also include customizable investor searches, book-marking of targeted investors, customization of a marketing page 42 that is viewable by investors with company logo and website link, the ability to upload marketing materials to a hedge fund personal page 44 or the marketing page 42, the ability to post and update performance statistics on a personal page, the ability to participate in capital introduction events depending upon the level of service and the use of a customer relationship management (CRM) system. Using the CRM, a hedge fund may create electronic folders on its personal page. The folders may permit the hedge fund to store information on investors the hedge fund has sourced and the ability to write notes related to each investor. Accordingly, the CRM may allow for very efficient sorting and organizational processing for the hedge fund.

After the hedge fund selects a level of service 40, the hedge fund may be asked to consent to a service agreement (if available) and undergo review related to the use of the website 20, search engine 18 and database 14. If the hedge fund agrees to accept the service agreement, it is prompted to provide contact information, specific details about the fund, and then to enter payment information to pay for any fees. For example, the hedge fund may be accessed a weekly, monthly or annual subscription fee to access the website 20, etc.

Still referring to FIGS. 1 and 2, as with a new investor, following entry of the above information and payment information, the hedge fund information may be forwarded to a service provider 32 for legal approval and then to an administrator 34 for further personal contact and information review. If approved, the hedge fund may be issued a temporary user name and password and permitted access to the website 20, etc once the service period begins. Further, similar to the investors, all contact and template information entered by the hedge fund may also be transferred into the database 12 of hedge fund information to function as the profile for that hedge fund.

Still referring to FIGS. 1 and 2 and turning again to investors, once admitted to the website 20 and provided with a personal page 38, the investor may access the search engine associate 16 with the hedge fund database 12. Specifically, the investor may initiate a search of the above described hedge fund template information 28. Following each search, the investor may be provided with a list of applicable hedge funds. The investor may then designate a particular hedge fund profile on the list to obtain basic information about the fund and may also access the hedge fund's virtual marketing page. The investor may also open and view the hedge fund's uploaded marketing materials on the hedge fund marketing page 42 and may add the fund to a list of book-marked funds on the investor's personal page 38.

Still referring to FIGS. 1 and 2, an investor may be permitted free use of the search engine 16 to search through the hedge fund database 12 and to screen hedge funds profiles before contacting hedge funds (using intra-system email or other contact information provided in the hedge fund profile), bookmark hedge funds, create a personal watch list of potential future investments, perform due diligence on hedge funds in a discrete manner, post investment criteria about the investor for hedge funds to see. Investors may limit the number of hedge funds that may view their full investor profile on any given day, week or month. For example, the investor's profile may include a code whereby that profile may be view no more than five (5) times per day. Finally, investors may also be granted complementary and priority access to capital introduction ("cap-intro") events sponsored by hedge funds. Notably, these cap-intro events may be recorded and made available on the hedge fund marketing page 42 for review investors. However, it will be appreciated that access to the recording of a cap intro event may be restricted to only certain investors.

Still referring to FIGS. 1 and 2, the hedge fund is permitted access to a search engine 18 that allows it to input data regarding the investor type about which the hedge fund would like information. The search engine 18 may then select investor profiles according to the search criteria and may also provide a hedge fund agent with an initial list of annotated investor profiles. An annotated investor profile may include a limited about of information concerning the investor as a means of informing the hedge fund if that investor is worth a full review. For example, an annotated profile may include the investor entity type information (i.e., institution type or individual), and basic information concerning that investor's manner or style of investing (e.g., long/short only). For purposes of privacy and/or security the investors name or other contact information may be omitted from the annotated investor profile. The hedge fund may then review the list of annotated investor profiles that were identify from the search and the search and the search criteria and select specific investor profiles for a full review. When the hedge fund agent accesses a full investor profile, that selection may be counted against the hedge funds total number of investor profile views per month. Further, in those instances wherein a hedge fund agent is provided with a large under of annotated investor profiles, the hedge fund may store a link to selected annotated profiles, or otherwise highlight or identify selected annotated profiles, for subsequent review. Accordingly, when the hedge fund agent is presented with a large number of annotated investor profiles, potentially relevant profiles from the larger list may be set aside during an initial review of the larger list into a virtual "radar screen" or database for a later analysis.

As mentioned above, the hedge fund may be permitted to access a limited number of full investor profiles depending upon the level of service selected. For example, each time a hedge fund agent accesses a full investor profile to obtain specific information, a record of that access is recorded, stored and compared to the number of investor profile review permitted by the service level selected by the hedge fund. Capping the number of full investor profiles that a hedge fund may review on, for example, a monthly basis functions as a barrier to a hedge fund being able to copy or otherwise download all the investor profiles in the database 14. Investor privacy is thereby reinforced.

Once a hedge fund accesses a full investor profile, the hedge fund may then be permitted to send a virtual business card to the investor's e-mail address and write a personal message. In response to a VBC, the investor may receive a picture of the virtual business card along with the personal message by e-mail. The hedge Fund may also save its search criteria or begin new searches with different criteria.

Regarding further operation of the CRM discussed above, when a hedge fund accesses an investor profile, an electronic link (hyperlink), or like electronic connection or tag to that profile may be stored in a "My Investors" file on the hedge fund personal page 44. Additionally, or alternatively, in response to the hedge fund accessing an investor's profile, an electronic link or record, etc., of that access may be stored on in "log file" on the investor's personal page 38. Thus, the method of the present invention, particular the CRM function, may assist investors and hedge funds to organize the information each participate in sourcing.

Finally, both hedge funds and investors are permitted access to list of outside service providers. These outside service providers may include Attorneys, Compliance, Conference Planners, Consultants, Internet Services, Marketing Services, Prime Brokers, Research Providers and Soft Dollar Brokers who may list their services on the website 22 for a monthly fee. For example, the outside services providers may be access using a dropdown menu from the home page. When registering with the website 22 to become a listed outside service provider, the outside service provider may be prompted to register the business by entering information about the business to make payment for the listing. The service provider may then provide with a username and password that allows them to access the information that is stored on the website and displayed so that they can edit the information.

Thus is described a novel business method of allowing hedge funds to search for investors and investors to search for hedge funds. The business method provides a safe, secure and confidential way of sourcing hedge fund investors at a very low cost.

Having thus described the method of the present invention, various other embodiments, while not identical to the embodiment(s) described above, will become apparent to those of skill in the art that are nevertheless within the scope of the several claims.

We claim:

1. A method for matching an investor and an agent on behalf of a private placement financial vehicle comprising:
   providing at least one computer server operable to receive and transmit electronic data, the server including a processor module and a computer readable electronic storage module;
   providing a web-based platform hosted on said at least one computer server and accessible through an internet connection, the web-based platform allowing access to an electronically searchable first database and an electronically searchable second database, each of the first and second databases being hosted on said at least one computer server;
   providing a plurality of private placement financial vehicle profiles on the first database, each private placement financial vehicle profile identifying an agent associated with a financial vehicle and each profile defining searchable criteria associated with the financial vehicle;
   providing a plurality of qualified investor profiles on the second database, each qualified investor profile defining searchable criteria associated with a qualified investor;
   providing on the at least one computer server a first search engine and a second search engine, the first search engine being operable to search the plurality of private placement financial vehicle profiles on the first database and the second search engine being operable to search the plurality of qualified investor profiles on the second database;
   receiving through the web-based platform a request by one of a qualified investor or an agent for a financial vehicle to access one of said search engines, wherein the qualified investor is provided search access to the first database or the agent for the financial vehicle is provided search access to the second database;
   receiving search criteria through the web-based platform associated with said searchable profile criteria in one of the first or second search engines corresponding to the investor profiles or the financial vehicle profiles, wherein the search criteria for the qualified investor profiles is provided by the agent of the financial vehicle and the search criteria for the financial vehicle is profiles is provided by the qualified investor; and
   transmitting from the at least one computer server in response to the received search criteria at least one of the qualified investor profiles to the requesting financial vehicle agent or the financial vehicle profile to the requesting qualified investor.

2. The method of claim 1, further comprising the step of receiving by the at least one computer server searchable information about a private placement financial vehicle that is entered and stored in an information template accessible through the web-based platform and provided in a financial vehicle profile.

3. The method of claim 2, further comprising transmitting the information template to a service provider for review using the web-based platform, wherein the service provider determines eligibility for being stored on the searchable first database based on predetermined qualifications.

4. The method of claim 1, further comprising receiving by the at least one computer server searchable investor information that is stored in an information template and at least partially provided in the investor profile, the information template being accessible through the web-based platform.

5. The method of claim 4, further comprising transmitting the information template to a service provider to determine if the investor is a qualified investor using the web-based platform.

6. The method of claim 1, further comprising storing private placement financial vehicle information in the first database.

7. The method of claim 1, further comprising entering qualified investor information into the second database.

8. The method of claim 1, wherein the number of qualified investor profiles transmittable to the agent in a predetermined period of time is limited by a service level designation for the agent.

9. The method of claim 1, wherein the private placement financial vehicle is a hedge fund.

10. The method of claim 1, further comprising transmitting qualified information from the private placement financial vehicle agent to the at least one qualified investor found in a search.

11. The method of claim 1, wherein the web-based platform includes one or more communication portals for accessing the searchable databases.

12. The method of claim 1, wherein the web-based platform and the searchable databases are accessible through a handheld electronic device.

13. The method of claim 1, further comprising providing a user or service agreement to be executed electronically to access the databases.

14. The method of claim 1, further comprising providing a questionnaire through a series of data screens or dropdown menus to enter information by a participating qualified investor or private placement financial vehicle agent corresponding to the profile of the participating qualified investor or private placement financial vehicle.

15. The method of claim 1 further comprising rejecting unqualified participants based on failure to meet predetermined criteria and transmitting a notice to the unqualified participant regarding reasons for denial.

16. The method of claim 1 further comprising the generation of a virtual business card containing profile information of at least one of the private placement financial vehicle agent or the qualified investor, wherein the virtual business card is used as an electronic method of introduction between the private placement financial vehicle agent and the qualified investor or vice versa.

17. The method of claim 1, wherein the qualified investor is provided with an investor personal page customizable to allow access to a plurality of savable searches of the first database.

18. The method of claim 1, wherein the qualified investor is granted access to capital introduction events sponsored by the private placement financial vehicle and the web based platform supports the event.

19. The method of claim 1, wherein the qualified investor creates an annotated investor profile providing a limited amount of searchable information allowing preliminary review by the private placement financial vehicle agent.

20. A method for matching an investor and an agent on behalf of a private placement financial vehicle comprising:

providing at least one computer server operable to receive and transmit electronic data, the server including a processor module and a computer readable electronic storage module, the at least one computer providing a communication link to a computer network remotably accessible by qualified users;

the computer network further allowing access to an electronically searchable first database and an electronically searchable second database, each of the first and second databases hosted on the at least one computer server;

providing a plurality of private placement financial vehicle profiles on the first database, each financial vehicle profile identifying an agent associated with the private placement financial vehicle and each profile defining searchable criteria associated with the private placement financial vehicle;

providing a plurality of qualified investor profiles on the second database, each profile defining searchable criteria associated with a qualified investor;

providing on the at least one computer server a first search engine and a second search engine, the first search engine being operable to search the plurality of financial vehicle profiles on the first database and the second search engine being operable to search the investor profiles on the second database;

receiving through the computer network a request by one of a qualified investor or an agent for the financial vehicle identified in said databases to access one of said search engines of one of said databases, wherein the qualified investor is provided search access to the first database and the agent for the financial vehicle is provided search access to the second database;

receiving search criteria through the computer network associated with said searchable profile criteria in one of the first or second search engines corresponding to the qualified investor profiles or the private placement financial vehicle profiles, wherein the search criteria for the qualified investor profiles is provided by an agent of the private placement financial vehicle and the search criteria for the private placement financial vehicle profiles is provided by a qualified investor; and transmitting from the at least one computer server in response to the received search criteria at least one of the qualified investor profiles to the requesting financial vehicle agent or the financial vehicle profile to the requesting qualified investor.

\* \* \* \* \*